United States Patent

[11] 3,525,366

| [72] | Inventor | Joseph H. De Frees<br>414 Liberty St., Warren, Pennsylvania 16365 |
|---|---|---|
| [21] | Appl. No. | 744,467 |
| [22] | Filed | July 12, 1968 |
| [45] | Patented | Aug. 25, 1970 |

[54] PIPE CAP
12 Claims, 11 Drawing Figs.

[52] U.S. Cl. .................................................. 138/109, 220/39
[51] Int. Cl. .................................................. F16l 9/00
[50] Field of Search .......................................... 138/89-96, 109; 267/53, 1; 29/484; 220/39

[56] References Cited

UNITED STATES PATENTS

| 2,179,191 | 11/1939 | McWilliams ................. | 138/89X |
| 2,287,750 | 6/1942 | Clayton ........................ | 138/89X |
| 2,422,070 | 6/1947 | Bettencourt .................. | 138/89X |

*Primary Examiner*— Louis K. Rimrodt
*Attorney*—Baldwin, Egan, Walling and Fetzer

ABSTRACT: A pipe cap formed by bending two elongated flat metal blanks into circular halves, joining the halves together to form a circular collar, cutting threads in the interior longitudinal wall of the collar, and securing a cap to the collar to form the finished pipe cap. In one form of the invention all parts are welded together. In another form, the cap is secured to the collar by fusible solder to form a fusible pipe cap.

Patented Aug. 25, 1970 3,525,366
Sheet 1 of 3
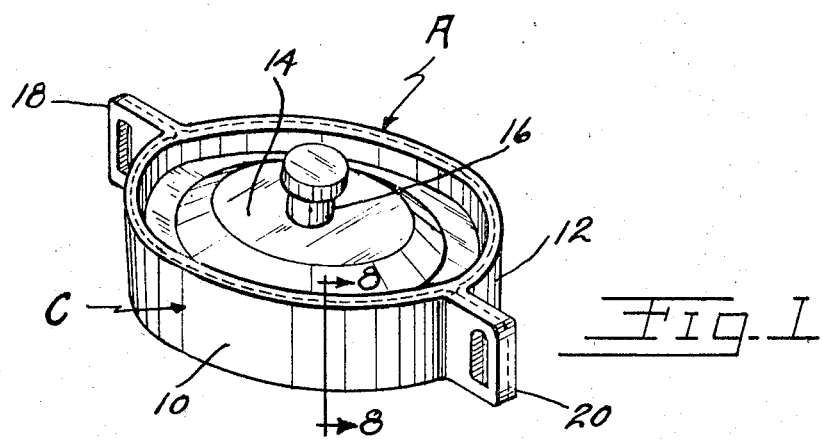
Fig. 1
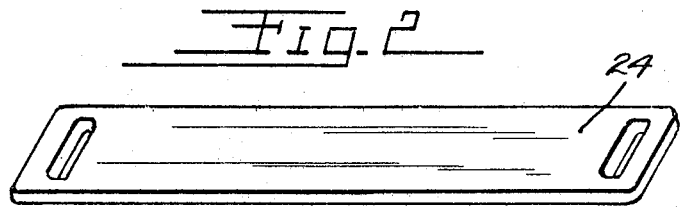
Fig. 2
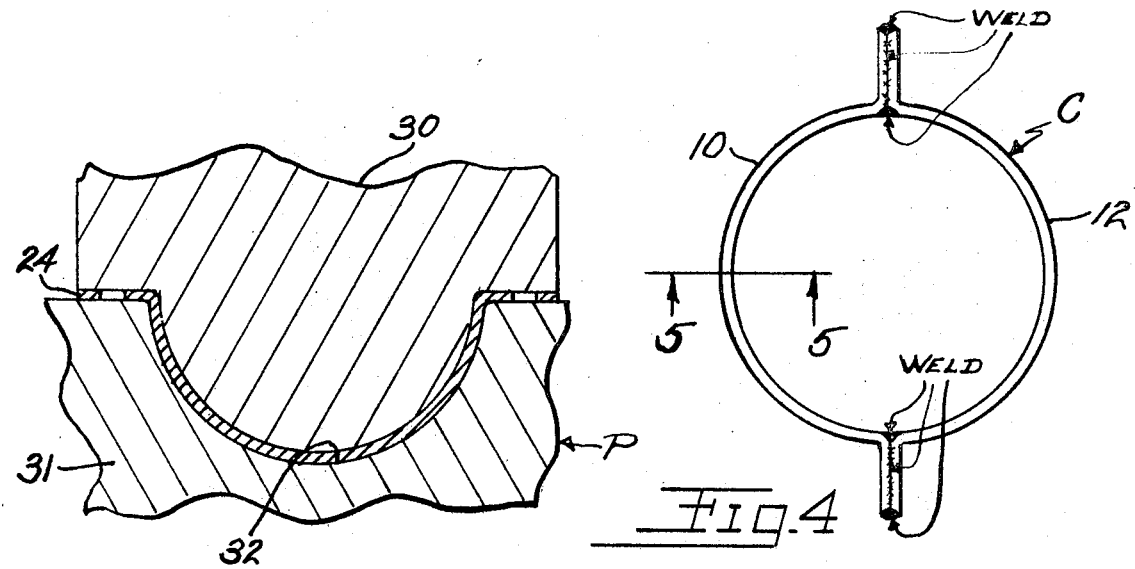
Fig. 3
Fig. 4
INVENTOR
JOSEPH H. DE FREES
BY Baldwin, Egan, Walling & Fetzer
ATTORNEYS INVENTOR
JOSEPH H. DE FREES
BY
Baldwin, Egan, Walling & Fetzer
ATTORNEYS

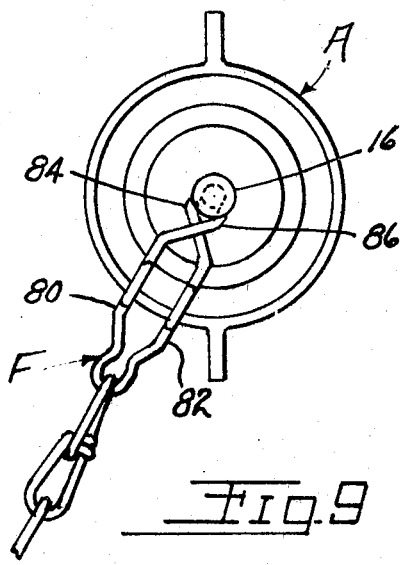
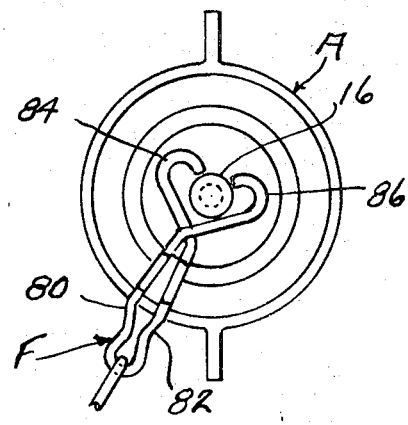
Fig. 9  Fig. 10
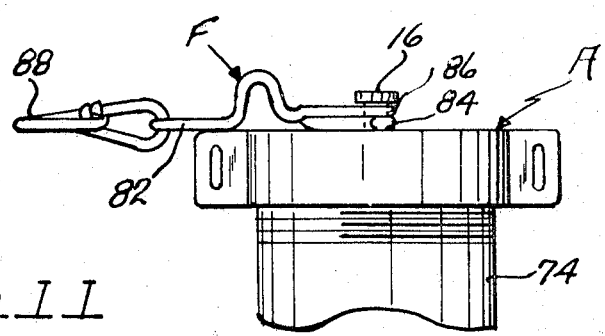
Fig. 11
INVENTOR
JOSEPH H. DeFREES
BY
Baldwin, Egan, Walling & Fetzer
ATTORNEYS

PIPE CAP

This invention relates to pipe caps and more particularly to pipe caps used in connection with tanks or containers for the storage or transportation of fluids.

There has long been a need for an economical, lightweight pipe cap that is simple in construction, inexpensive to manufacture, and highly effective in operation.

Prior pipe caps were usually made of cast metal formed into a one-piece, closed-end structure which is relatively expensive in that it is difficult to form threads in a closed-end cap. Not only are such prior caps expensive, but they have ineffective attaching means for attaching the cap to the tank when the cap was removed from the pipe, such attaching means becoming easily loosened under vibrations of road action and use, with resulting loss of the cap. In prior fusible caps, contact of the stored product with the fusible material was common, with the result that the product became contaminated.

Therefore it is an object of the invention to provide a fabricated pipe cap that is simple in construction, most inexpensive to manufacture, and highly effective in operation.

A further object of the invention is to provide a fabricated pipe cap of the above type having attaching means that will not become loosened under road vibrations and use.

A further object of the invention is to provide a fusible fabricated pipe cap constructed to prevent contamination of the stored product by the fusible material.

A further object of the invention is to provide a fabricated pipe cap that is light in weight and effects a hand-tight seal.

A further object of the invention is to provide a chain-type pipe cap releasable attaching means that securely attaches the pipe cap to the tank, whereby the cap cannot become inadvertently disattached from the tank under normal or even adverse operating conditions.

Briefly, the foregoing objects are accomplished by the provisions of a pipe cap formed of two elongated flat metal blanks bent into semi-circular halves and joined to form a circular collar, with a cap secured adjacent one end of the collar to form the pipe cap. Threads are cut on the interior longitudinal wall of the collar adjacent the lower end of the collar before the cap is added thereto. The two halves and the cap may all be welded together to form a unitary stainless steel pipe cap. In another form of the invention, the cap is joined to the collar by fusible metal to form a fusible pipe cap. The collar bore may be counterbored at the upper end of the collar for receiving the cap therein, and such cap may have an annular flange on its periphery for placement in the counterbore to provide more surface exposure for the fusible material.

The cap may be provided with an upstanding chain post or stud (welded to the cap) for receiving a spring clip chain connector in a releasable positive lock whereby the pipe cap cannot become disengaged and lost. One or more asbestos and/or Teflon gaskets may be provided to effect a hand-tight seal.

Thus there is provided a pipe cap of simplified, inexpensive construction that effects a positive hand-tight seal and which cannot become inadvertently disattached from the tank.

Other objects and advantages of the invention will be apparent from the following description taken in conjunction with the drawings wherein:

FIG. 1 is a perspective view of a pipe cap constructed in accordance with the invention;

FIG. 2 is a metal blank used to form a half of the collar;

FIG. 3 is a side elevational sectional view of a die press for forming the collar halves, and showing the die in final position after forming a semi-circular collar half;

FIG. 4 is a top plan view of the pipe cap collar;

FIG. 9 is a top plan view of a pipe cap of the invention and showing a chain connector attached thereto;

FIG. 10 is a view similar to FIG. 9, but showing the connector in open position; and FIG. 11 is a side view of the device shown in FIG. 9.

Figure 5:
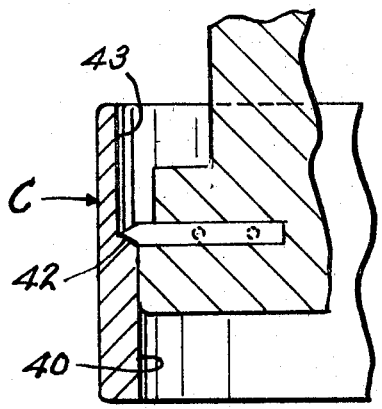
FIG. 5 illustrates the counterboring operation on the collar and is taken along the line 5—5 of FIG. 4.

Although the invention is shown and described herein with respect to pipe caps for storage and transportation tanks, it will be understood that it may be used on any type of pipe or flanged container opening.

Referring first to FIG. 1, there is shown a fabricated pipe cap A of the invention and including a pair of coacting matched halves 10 and 12 joined together as shown to form a collar C, and a cap 14 secured to the collar C. An upstanding stud or chain post 16 is welded or otherwise secured to the cap 14 for chain attaching the cap to an associated adjacent object such as a tank (not shown). The collar C may be formed with a pair of spaced lugs 18 and 20 for receiving a wrench or for attaching a taped shipment seal thereto.

A feature of the invention is the fabrication of the pipe cap. First an elongated blank or flat strip of metal (or like material) 24 (FIG. 2) is selected and placed in a die or press P (FIG. 3) including a vertically reciprocable forming head 30 and a coacting die bed 31 having a die cavity 32 formed therein. In operation, the blank 24 is positioned over the cavity 32 and the head 30 is then rammed downwardly into the coacting cavity 32 to form a semi-circular stamping in the form of a semi-circular matched half or blank 10 for example. Two such matched halves (10 and 12) are so formed and joined together, by means such as welding, to form the completed circular collar C as shown in FIG. 4.

Figure 6:
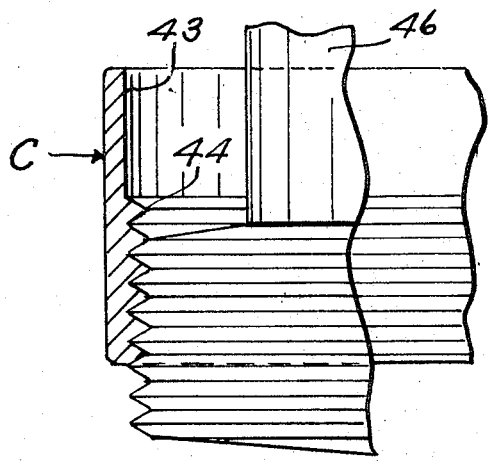
FIG. 6 is a view similar to FIG. 5 and further illustrating the threading operation on the collar subsequent to counterboring.

Next, the collar C is counterbored as shown in FIG. 5. Specifically, one end portion such as the upper end portion of the inner longitudinal wall or bore 40 is counterbored (for a purpose hereinafter described) by the counterbore tool 42 to form a counterbore 43. Threads 44 are then cut in the lower portion of the bore or inner longitudinal wall 40 of the collar C as shown in FIG. 6, by the pipe tap 46. Such threads 44 coact with threads on an associated pipe in the usual manner.

Figure 7:
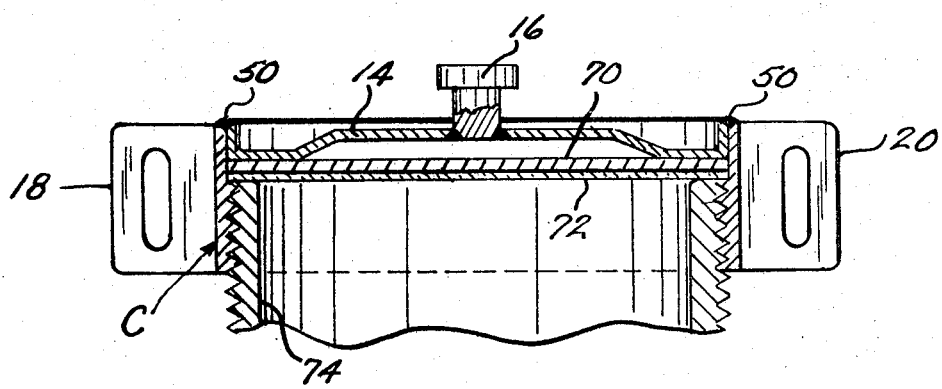
FIG. 7 is a side elevational sectional view of another pipe cap constructed in accordance with the invention and showing the cap attached to a pipe.

For the final step, the cap 14 is secured to the collar C adjacent the upper end thereof. This may be done by various means. In FIG. 7, for example, the cap 14 is secured to the collar by the weld 50.

Figure 8:
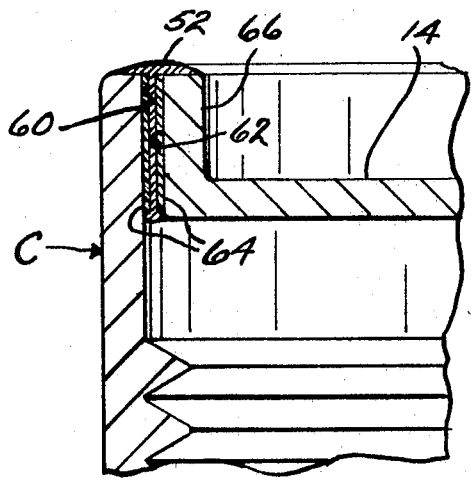
FIG. 8 is an enlarged view taken along the line 8—8 of FIG. 1.

In FIG. 8 the cap 14 is secured to the collar C by fusible material such as fusible solder 52. In this latter instance the opposed surfaces 60 and 62 of the collar and cap, respectively, are first tinned with tinning material 64, after which the fusible material 52 is inserted therebetween. It is preferred that the cap 14 be provided with an outer annular circumferential flange 66 formed on the periphery of the cap for placement in the counterbore 43 to provide increased tinning or fusing area to effect a stronger fused joint.

As shown in FIG. 7, gaskets 70 and 72 may be provided to effect a tight seal with the associated pipe 74. The resilient back-up gasket 70 may be of asbestos and Buna-N, and the gasket 72 may be a non-resilient Teflon overlay. When the two gaskets are used together, the sealing takes place between the pipe 74 and the Teflon gasket, and no product reaches the Buna-N gasket. In applications which are not demanding, the asbestos and Buna-N gasket will be adequate and will, in itself, provide the sealing surface. This design precludes any contact between the lading and metal parts of the cap, thereby preventing contamination of the stored product. In line with this, it will be noted that the design feature which excludes the product from contact with the fusible material not only eliminates the chance of contaminating the product, but also prevents the weakening of the fusible joint due to any corrosive effect of the product.

To prevent the pipe cap A from becoming lost, an expandable scissor-type chain clip connector or fitting F is provided as shown in FIGS. 9, 10 and 11. Said chain clip F comprises a single piece of spring wire bent intermediate its ends into a U- shaped configuration forming spaced arms 80 and 82 flexible toward and away from each other with the outer end portions of the arms bent to cross over each other as shown. The extreme end portions of the arms are bent into reversing loops 84 and 86 which coact with each other to clasp the stud 16 with a releasable fit when the arms are flexed together. The fitting F is attached at its other end to a chain 88 which, in turn, is secured to a container (not shown).

With respect to the fusible pipe cap, at elevated temperatures the fusible metal melts and the cap 14 parts from the collar C, thereby effecting emergency venting in case of fire exposure, and thus providing for the escape of vapors generated during such fire exposure, with the result that pressures within the tank are kept within safe limits.

The studs 18 and 20 may also be used to hold the collar C during the tapping and threading operation.

Thus the pipe cap A of the invention is fabricated, not cast, for considerable savings in weight and cost. Additionally, these caps have a large venting capacity. The fusible joints are soldered, not mechanical, for protection against leakage. Critical temperature is 250°F., maximum, although this may be varied depending on the rating of the fusible material used.

The asbestos and Buna-N full gasket seals when hand tight and prevents contact of product with fusible material. A Teflon overlay gasket is also included with stainless caps.

Chain attaching is simplified and improved by employment of a permanent stud which cannot become lost while cleaning.

The stainless steel chain connector snaps on or off pipe caps or fusible caps to protect against loss. The spring tension of this connector holds the chain firmly to the cap—yet allows the cap to be revolved freely for tightening or loosening.

The caps are strong, light-weight, easily cleaned, free from porosity and low in cost with full gasketing, chain attaching stud and seal lugs. The present pipe caps fit both straight and tapered pipe threads.

The method of fabrication is a unique feature of the invention in that the threading operation is performed after the two matched halves 10 and 12 are joined. This is particularly advantageous, because the tap can extend through the collar. It is always difficult to tap a blind hole. This eliminates a machining operation, as the inside diameter has been made to size. The closure cap 14 is then welded or soldered into place. Identical parts are used in both the fusible cap and the solid cap (i.e., welded cap).

Additionally, with respect to the fusible pipe cap, there is provided a through-flow cross-sectional area larger than that of the pipe 74, as best shown in FIG. 7. Specifically, the inside diameter of the collar C is larger than the inside diameter of the pipe 74.

I claim:
1. A fabricated pipe cap for threaded attachment to the threaded end of an associated pipe comprising; a pair of coacting, semi-circular blanks secured together to form a circular collar, said collar having threads formed on its inner longitudinal wall inwardly from one end of the collar to coact with the threads on the end of the associated pipe; and a cap secured to the collar adjacent the other end thereof.

2. The structure of claim 1 wherein said blanks are welded together and said cap is welded to said collar.

3. The structure of claim 2 and further including an annular asbestos gasket adjacent the cap, and a Teflon overlay liner gasket adjacent the asbestos gasket to provide an air-tight seal.

4. The structure of claim 1 wherein said cap is secured to the collar with fusible solder to form a fusible pipe cap.

5. The structure of claim 4 wherein the inner longitudinal wall of the collar is countersunk inwardly from said other end for receiving the fusible metal between such countersunk wall and the cap.

6. The structure of claim 5 wherein said cap has an annular circumferential flange on its periphery disposed in the countersunk portion of the collar, and said fusible material is disposed between such flange and the countersunk portion of the collar.

7. The structure of claim 4 wherein said pipe cap includes an annular resilient asbestos gasket disposed adjacent the cap to prevent contact between the fusible material and the product in the associated pipe.

8. The structure of claim 4 wherein the collar has a greater inside diameter than the associated pipe, whereby the pipe cap has a greater through-flow cross-sectional area than the associated pipe.

9. The structure of claim 1 wherein said collar has a pair of oppositely spaced lugs on its periphery for receiving a wrench and for receiving a taped seal.

10. The structure of claim 1 and further including an upstanding chain post secured to said cap for receiving an associated chain for attaching the cap to an adjacent object.

11. The structure of claim 10 wherein an expandable chain clip is detachably secured to said chain post.

12. The structure of claim 11 wherein said chain clip comprises a single piece of spring wire bent intermediate its ends into a U-shaped configuration forming spaced arms flexible toward and away from each other with the outer end portions of the arms bent to cross over each other, the extreme end portions of the arms being bent into reversing loops which coact with each other to clasp the stud with a releasable fit when the arms are flexed together.